United States Patent [19]

Van Tassel et al.

[11] 4,141,243
[45] Feb. 27, 1979

[54] APPARATUS FOR TESTING THE VOLUMETRIC OUTPUT OF FUEL INJECTOR SYSTEM COMPONENTS

[75] Inventors: Norman L. Van Tassel, Pittsburgh; Vladimir Lang, Monroeville, both of Pa.

[73] Assignee: Bacharach Instrument Company, a division of AMBAC Industries, Inc., Pittsburgh, Pa.

[21] Appl. No.: 902,419

[22] Filed: May 3, 1978

[51] Int. Cl.² .............................................. G01F 9/00
[52] U.S. Cl. ..................................... 73/119 A; 73/168
[58] Field of Search ...................... 73/3 R, 119 A, 168

[56] References Cited

U.S. PATENT DOCUMENTS

| | | | |
|---|---|---|---|
| 3,344,667 | 10/1967 | Maltby | 73/3 |
| 3,367,176 | 2/1968 | Emerson | 73/119 A |
| 3,421,360 | 1/1969 | Luse et al. | 73/3 |
| 4,088,012 | 5/1978 | Emerson | 73/119 A |

*Primary Examiner*—Herbert Goldstein
*Attorney, Agent, or Firm*—Parmelee, Miller, Welsh & Kratz

[57] ABSTRACT

The volumetric output of fuel injectors is rapidly and accurately measured by accumulating in first and second counters respectively, a count of pulses generated as a function of the strokes made by the injector, and a count of pulses generated by an optical encoder attached to the piston of a positive displacement flow meter through which the output of the injector is directed. When the first counter reaches a count representative of a preset number of injector strokes, the accumulated count in the second counter representative of injector output for the preset number of strokes is stored and displayed continuously while the counters are reset and the test cycle is automatically repeated. The direction of movement of the reciprocating piston of the positive displacement flow meter is automatically reversed by the control system as either end of travel is reached through coordinated operation of a pair of solenoid valves. The control system inhibits both counters during piston reversal and synchronizes resumption of counting to eliminate errors due to transients. Because of the high accuracy of the system, accurate measurements of injector volumetric flow are obtained in 50 injector strokes rather than the conventional 1000 strokes or even the 100 strokes of some newer systems.

8 Claims, 5 Drawing Figures

APPARATUS FOR TESTING THE VOLUMETRIC OUTPUT OF FUEL INJECTOR SYSTEM COMPONENTS

BACKGROUND OF THE INVENTION

1. Field of the Invention

This invention relates to apparatus for testing the volumetric output of fuel injector system components and more specifically to apparatus of this type which provides rapid, accurate and continuous data.

2. Prior Art

Prior art techniques for testing the output of fuel injectors for diesel engines and the like have been time consuming and not as accurate as is desirable. Generally, in such test equipment, fluid pumped by the cam driven injector is collected in a measuring device and read at the end of a predetermined number of injector strokes. In one such tester, the fluid is collected in a graduate and the volume of fluid collected at the end of the preset number of stokes is read visually from the scale. In such a tester, fluid is generally accumulated for 1000 strokes in order to obtain a reading with an accuracy of ± 1%. At the end of the test cycle, the graduate must be emptied to prepare it for the next test or to repeat the test. Clearly, this method of testing injector output takes considerable time.

Another type of prior art fuel injector tester is disclosed in British Pat. No. 1,185,897. In this tester, fuel from the injector is accumulated in a cylinder where it displaces a spring-biased piston. A pointer connected to the piston rod through a rack and pinion arrangement is deflected relative to a scale which indicates the volume of fluid in the cylinder. Flow to the cylinder is terminated after a preset number of strokes so that the position of the pointer at that time is an indication of the volume of fluid metered by the injector in the preset number of strokes. When a button is pressed to initiate a new test, a valve is opened to divert the fluid to a reservoir as the spring returns the piston to the starting position. With this apparatus 100 strokes of the injector are used in the test cycle which speeds up the testing, but the accuracy remains about the same as in the graduated tube method. As in the case of the graduated tube tester, the presentation of the results of the test are no longer available when a new test cycle is initiated. In addition, this apparatus is subject to errors resulting from operation of the start and stop solenoids during the measuring period. Errors can also be induced in this equipment and in the graduated tube apparatus by fluid which is retained in the cylinder or graduated tube between measurements. There is also difficulty in these prior art systems of maintaining calibration.

It is a primary object of this invention to provide an improved fuel injector tester which provides an accurate measurement of fuel injector output with a minimum number of injector strokes.

It is also an object of the invention to provide such a tester which is reset in minimum time.

It is a further object of the invention to provide such a tester which rapidly and continuously repeats the tests.

It is another object of the invention to provide such a tester which offers a continuous presentation of the test results while repeated tests are being made.

It is still another object of the invention to provide such a tester which offers a digital display of the test results.

SUMMARY OF THE INVENTION

In accordance with this invention, apparatus for measuring the volumetric output of fuel injector system components includes a supply of fluid and a motor for operating the component. The fluid metered by the component is directed through a conduit to a positive displacement flow meter. The positive displacement flow meter has a piston reciprocally slidable in a cylindrical chamber and valves at each end of the chamber for introducing fluid at one end and exhausting fluid from the opposite end to drive the piston toward the opposite end of the chamber and for alternately reversing the flow of fluid to drive the piston back toward the one end.

A first pulse generator generates pulses as a function of the cyclical operations of the fuel injector system component. A second pulse generator generates pulses as a function of the incremental movement of the flow meter piston. The pulses generated by the first and second generators are accumulated in first and second counters respectively. Control means responsive as the piston in the positive displacement flow meter approaches a predetermined point adjacent each end of the flow meter cylindrical chamber, sequentially (1) inhibits the counters, (2) operates the valves to reverse the movement of the piston, and then (3) reenables the counters. When a predetermined count representative of the number of cycles of the fuel injector system component is accumulated in the first counter, the count accumulated in the second counter is stored and displayed, and then both counters are reset. Following reset of the counters a new test cycle is begun. While the test is being repeated the results of the previous test cycle remain visible on the display. In one specific embodiment of the invention, the positive displacement flow meter may include a central mounting block and two housings mounted on opposite ends of the mounting block with confronting cylindrical chambers in the housings axially aligned. One end of the piston is received in and slidable within each cylindrical chamber.

The disclosed embodiment of the invention is provided with a start up delay which inhibits the counters for a predetermined interval after start-up to allow the flow of fluid to the positive displacement flow meter to stabilize. Also, resumption of counting by both the stroke counter and the displacement counter following reversal of the piston in the positive displacement flow meter is controlled by a signal from the first pulse generator so that measurement always resumes at the same point in the cycle of the fuel injector system component.

The invention is primarily intended to be used to test the volumetric output of the fuel injectors in which case the first pulse generating means generates pulses as a function of the strokes of the fuel injector. It is desirable when testing injectors to provide a damper in the conduit which delivers metered fuel to the positive displacement flow meter so that piston movement is continuous despite the intermittent output of the injector. The invention may also be used to test the volumetric output of fuel pumps used in systems in which the injector does not incorporate its own pump. In this instance, the first pulse generating means will generate pulses as a function of the revolutions of the pump camshaft.

DESCRIPTION OF THE PREFERRED EMBODIMENT

Figure 1:
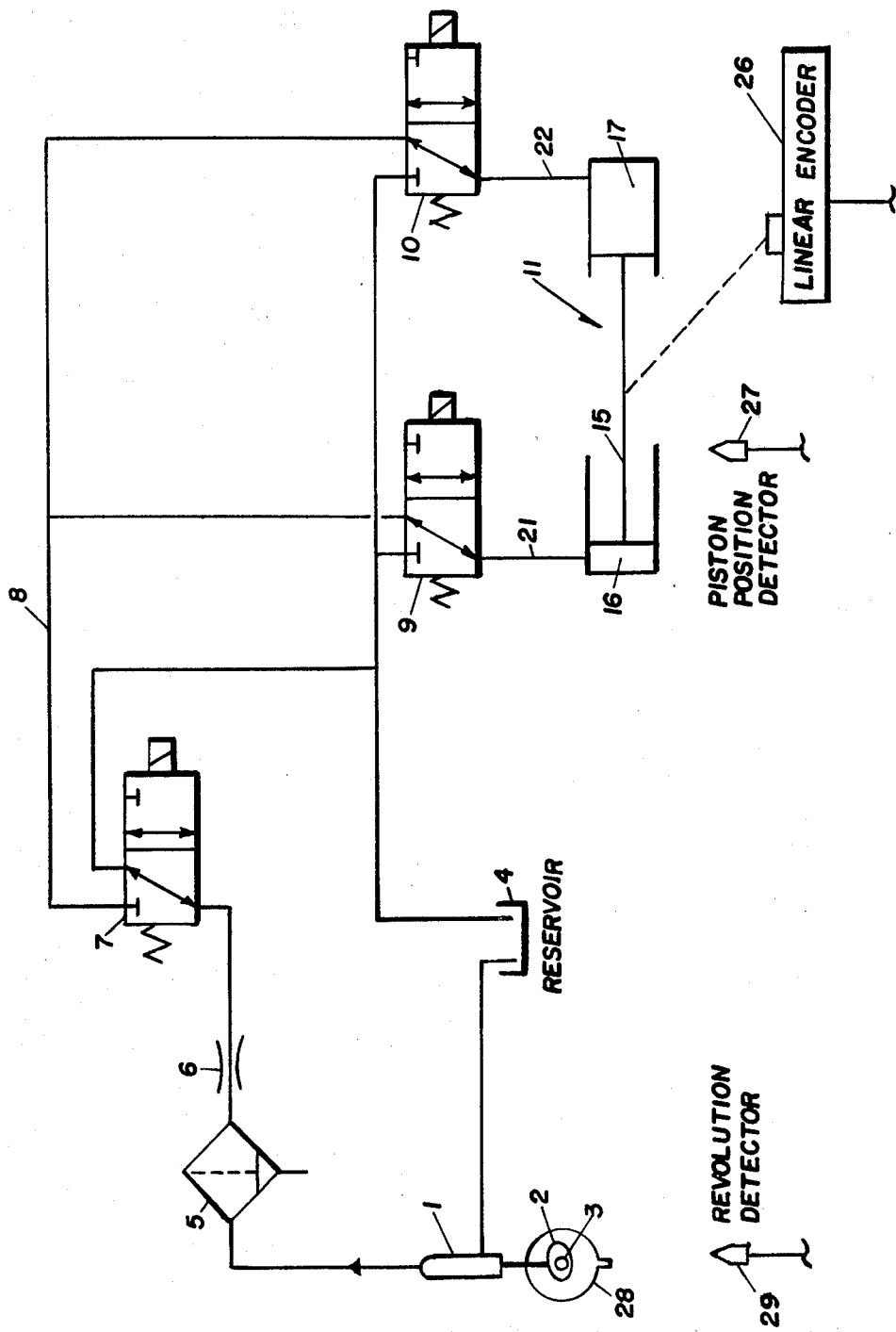
FIG. 1 is a schematic diagram of the hydraulic system for a fuel injector tester incorporating the invention.

As shown in FIG. 1, the volumetric output of a fuel injector is measured in accordance with the invention by mounting the injector 1 in a test stand where it is operated by a cam 2, carried by a shaft 3 which in turn is driven by a motor (not shown). Calibrating oil is supplied to the injector 1 from a reservoir 4. Oil metered by the fuel injector 1 passes through a filter trap 5 and a fluid pulse damper 6 to a solenoid valve 7. The filter trap removes foreign particles that might clog the orifice of the pulse damper 6 and together they smooth out the pulses produced by the injector to deliver a continuous flow of calibrating oil to the solenoid 7.

Solenoid valve 7 is a three-way valve which is spring biased as shown to divert calibrating oil to the reservoir 4. When solenoid 7 is energized, calibrating oil is directed through conduit 8 to additional three-way solenoid valves 9 and 10. Valves 9 and 10 are connected to opposite ends of positive displacement flow meter 11. As described below, these two valves are operated in opposition to each other. The valve 9 or 10 which is deenergized directs fluid from conduit 8 to the associated end of the flow meter while the energized valve directs oil from its associated end of the flow meter back to the reservoir 4.

Figure 5:
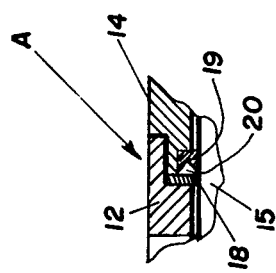
FIG. 5 is an enlarged sectional view of a portion of the flow meter shown in FIG. 4.
Figure 3:
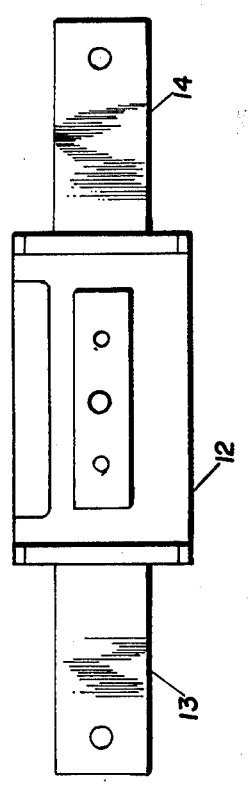
FIG. 3 is a plan view of a positive displacement flow meter in accordance with the invention.
Figure 4:
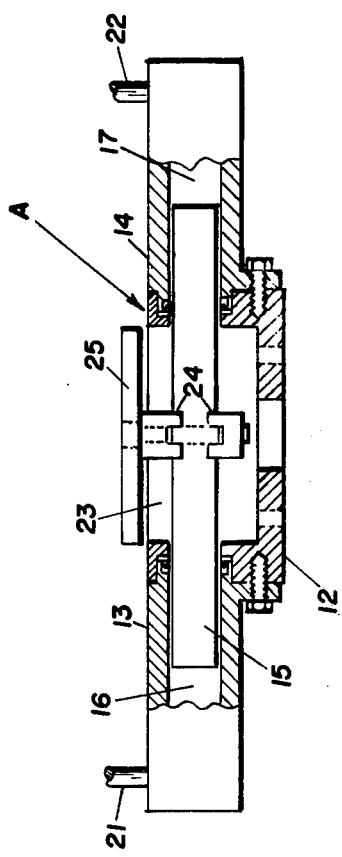
FIG. 4 is a side elevation view with parts cut away of the positive displacement flow meter for FIG. 3.

The positive displacement flow meter 11 is shown in plan view in FIG. 3 and in an elevation view in FIG. 4 with some parts cut away for clarity. The flow meter 11 includes a central mounting block 12 with housings 13 and 14 bolted to opposite ends thereof in alignment to receive a common elongated piston 15 which is reciprocally slidable in bores in cylinders 13 and 14 to form variable volume chambers 16 and 17. As shown in the enlargement of area A illustrated in FIG. 5, the piston 15 is supported by bearings 18 and sealed by O rings 19 mounted in annular recesses 20 formed between the mounting block 12 and the housings 13 and 14. The chambers 16 and 17 are connected to solenoid valves 9 and 10 through conduits 21 and 22 respectively.

A channel 23 in the center of the mounting block 1 provides access to the center portion of the piston 15. A two piece clamp 24 clamped about the center of the piston 15 projects above the level of the mounting block 12 and supports an adapter plate 25. The clamp 24 and adapter plates 25 are secured by a bolt passing through the piston 15.

Mounted on the adapter plate 25 is a linear encoder 26 (not shown in FIGS. 3 and 4) which generates pulses representative of incremental linear displacement of the piston 15 in either direction. A suitable linear encoder is a Tri-Onics optical encoder. The reading head of the optical encoder is bolted to the adapter plate 25 and a continuous series of pulses are generated by the encoder 26 as the piston reciprocates in the bores in the housings 13 and 14.

In addition to the linear encoder, a detector 27, depicted symbolically in FIG. 1, generates a signal when the piston 15 approaches a predetermined point adjacent its limit of travel in each direction. As discussed below, these signals are used to operate solenoid valves 9 and 10 to reverse the direction of the piston.

An encoder wheel 28 connected to the driven cam shaft 3 cooperates with a detector 29 to generate a signal for each stroke of the fuel injector 4. Any suitable detector may be used with a magnetic or optical detector being preferred.

Figure 2:
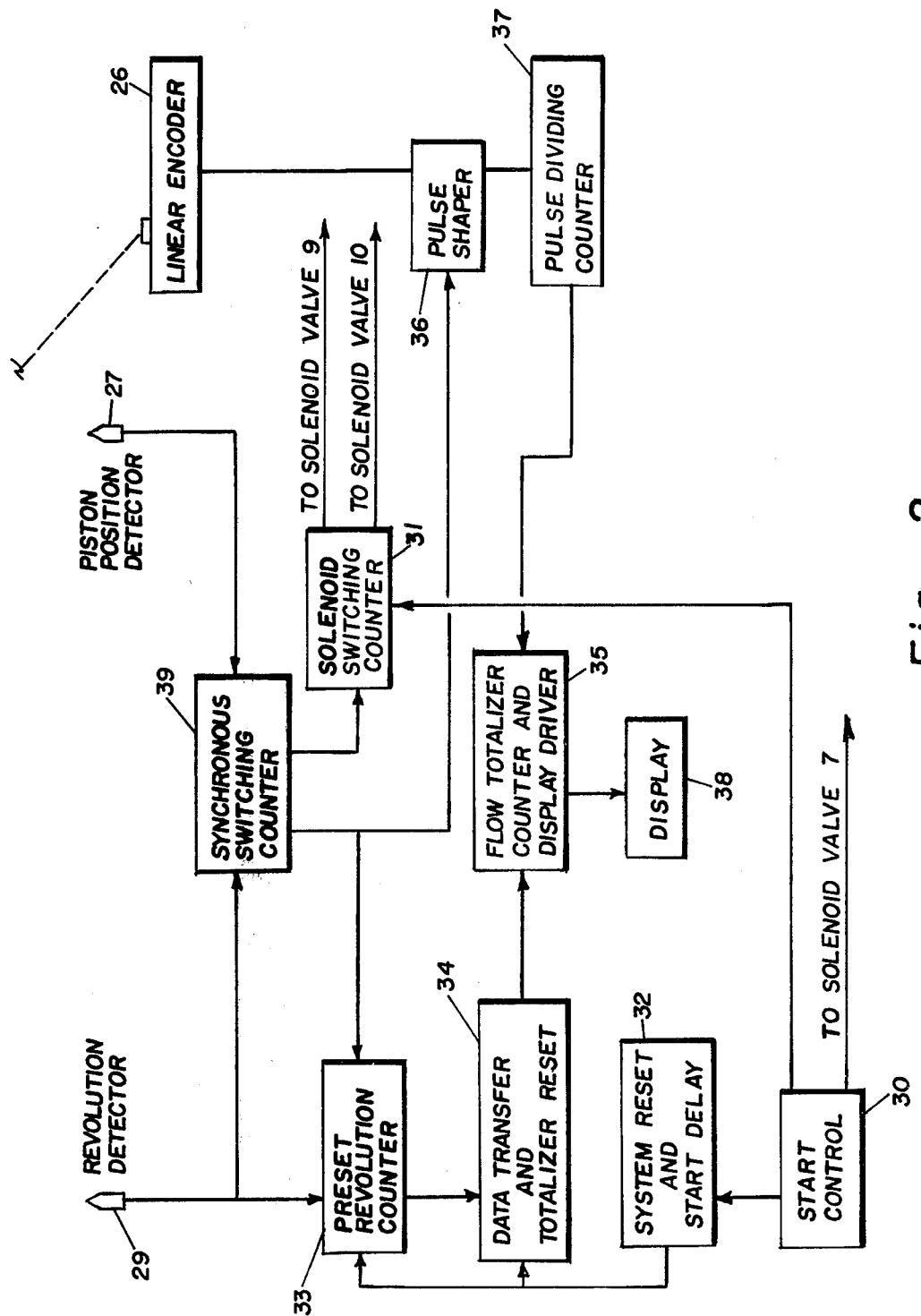
FIG. 2 is a schematic diagram in block diagram form of a control system for operating the tester of FIG. 1.

The block diagram of FIG. 2 illustrates the control system for the tester. The start control 30 provides power to start the motor to drive the fuel injector and provides an interlock to prevent operation of the remainder of the system until the start-up phase is completed. During start-up, solenoid valve 7 is deenergized so that calibrating oil metered by the injector is diverted directly back to the reservoir 4. This bleeds any air from the hydraulic lines before it can enter the metering system. At the completion of this phase, solenoid valve 7 is energized to direct metered fluid through conduit 8 to the positive displacement flow meter 11, and solenoid switching circuit 31 is activated to energize either solenoid valve 9 or 10. Solenoid switching circuit 31 is a flip-flop circuit which energizes one or the other of solenoid valves 9 and 10 but not both. Assuming for purposes of illustration that solenoid switching circuit 31 energizes solenoid valve 10, fluid will be directed from the fuel injector through conduit 8 and deenergized solenoid valve 9 to chamber 16. This will cause the piston 15 to move to the right in FIG. 1 and the fluid in chamber 17 will be returned to the reservoir 4 through the energized solenoid valve 10.

As the piston 15 of the flow meter begins reciprocating, the system reset and start delay shown in block 32 of FIG. 2 resets the revolution counter in block 33 and through the data transfer and totalizer reset circuit designated as block 34, resets the flow totalizer counter in block 35. These two counters are held in the reset condition by the system reset and start delay circuit 32 for an interval sufficient to permit the hydraulic circuit to stabilize.

At the completion of the start delay, the counters are released and the preset revolution counter 33 begins counting pulses generated by the stroke detector 29. At the same time, the pulses generated by the linear encoder 26 as the fluid entering chamber 16 drives the piston 15 of the positive displacement flow meter to the right in FIG. 1, are converted into a square wave signal by pulse shaper 36. The pulses of this square wave signal are divided down in pulse divider 37 and a count of the resultant pulses is accumulated in the flow totalizer counter and display driver 35. This latter circuit is a standard readily available integrated circuit chip such as a Mostek MK 5007 which includes a set of latches into which the accumulated count can be dumped and stored. Accordingly, when the revolution counter has reached the preset count of injector strokes, the data transfer and totalizer reset circuit 34 dumps the accumulated count of processed linear encoder pulses in the flow totalizer counter into the latches of the flow totalizer counter and display driver circuit 35 and then resets both the revolution counter in block 33 and the flow totalizer counter in block 35 and both counters resume counting. The latches of the flow totalizer counter serve as drivers for a display 38 which displays the stored encoder count, preferably in digital form. Since the linear encoder pulses are a direct measure of the displacement of the piston 15 in the positive displacement flow meter 11, the count displayed in the display 38 is a volumetric measure of the fluid metered by the injector during the preset number of injector strokes.

Assume, however, that before the preset number of injector strokes has been counted, the piston 15 of the positive displacement flow meter 11, approaches the end of its travel. As it approaches this point, a signal generated by the piston position detector 27 is applied to the synchronous switching counter circuit illustrated as block 39. This circuit generates signals which terminate counting by the preset revolution counter 33 through a direct inhibit signal and by the flow totalizer counter 35 through an inhibit signal applied to the pulse shaper circuit 36. The synchronous switching counter 39, which is clocked by pulses from the revolution detector 29, then triggers the flip-flop of the solenoid switching circuit 31, to deenergize solenoid 10 in the example above and energize solenoid 9 thereby reversing the direction of the piston 15 by directing metered flow from conduit 8 into chamber 17 of the flow meter and exhausting fluid from chamber 16 to the reservoir 4. In order to allow time for the transients to dampen out, the synchronous switching circuit 39 delays for two pulses from the revolution detector 29 before releasing the inhibits on the preset revolution counter 33 and, through the pulse shaper 36, the flow totalizer counter 35. Resumption of counting is keyed to pulses generated by the revolution detector so that flow measurement after piston reversal always begins at the same point, preferably the botton, of the injector stroke.

Measuring equipment made in accordance with this invention requires few close tolerance parts, therefore, it is easier and less expensive to manufacture than the prior art apparatus. Since it incorporates a flow meter that can measure a continuous flow of calibrating oil, the apparatus has increased capacity over prior art testers and can provide accurate measurement for injectors having a wide range of volumetric outputs. In addition, since the hydraulic system does not require draining between readings, the rest period between measurements is greatly reduced and the error attributable to retained fluid in the prior art systems requiring draining is eliminated. Furthermore, the disclosed system eliminates measurements made while valves are opening and closing and simplifies system calibration, both of which contribute to the high accuracy of the system. Errors attributable to air entrained in the calibrating fluid are eliminated by maintaining the fluid under pressure created by the force necessary to overcome the friction of the piston seals and the linear encoder. This pressure together with this continuous flow of calibrating oil provided by the damper 6, maintains continuous movement of the piston 15 to eliminate false counts that could be induced by stopping and starting of the piston. Alternatively, this pressure may be generated by a check valve in the return line to the reservoir 4.

An important feature of the disclosed apparatus is that its high accuracy permits measurements to be taken over fewer injector strokes. It is common practice to accumulate and measure the calibrating oil metered by an injector over 1000 strokes. With the present apparatus, measurements with an accuracy of 0.5% for even the smallest injector can be made in 50 strokes. In the system disclosed, the diameter of the piston 15 is 0.6233 inches and a pulse is applied to the flow totalizer for each 0.001 inch displacement of the piston. Thus each pulse applied to the flow totalizer represents 5 mm$^3$ of calibrating oil. Since pulses are accumulated for 50 strokes, the display is made to read the average volumetric output per stroke of the injector with a resolution of 0.1 mm$^3$ merely by moving the decimal point of the count accumulated in the flow totalizer for 50 strokes, one place to the left.

The exemplary embodiment of the invention is designed to accommodate fuel injectors having a volumetric output of from 50 to 500 mm$^3$ per stroke. Since the flow meter is sized to measure 10 cc of calibrating oil between reversals of the piston, the worst case for the 500 mm$^3$ per stroke injector would require 3 reversals of the piston in order to measure the output from 50 strokes. However, since measurement is suspended during the reversal, the accuracy of the reading is preserved. The equipment can be modified to accommodate larger fuel injectors or to make measurements over a greater number of strokes very easily, such as by increasing the capacity of the flow totalizer counter or dividing down the pulses by a larger factor.

The invention can also be applied to measurement of the volumetric output of fuel pumps such as those used in systems in which the fuel injectors do not incorporate their own pumps. In that case, the revolution counter will count the preset number of revolutions of the pump camshaft. By judicious selection of encoder resolution, piston diameter and the preset number of revolutions, flow information can be displayed in various engineering terms.

While the invention has been described in some detail, it will be apparent to those skilled in the art that numerous modifications and alternatives fully within the spirit of the invention can be made and, therefore, the scope of the invention is to be limited only by the appended claims.

We claim:

1. Apparatus for measuring the volumetric output of fuel injector system components comprising:

a supply of fluid for the fuel injector system component;

motor driven means for cyclically operating said fuel injector system component;

first pulse generating means for generating pulses as a function of the cyclic operation of the fuel injector system component;

a positive displacement flow meter having a piston reciprocally slidable in a cylindrical chamber and valve means at each end of the cylindrical chamber for introducing fluid to one end of the cylindrical chamber and exhausting fluid from the opposite end to drive said piston toward said opposite end of the cylindrical chamber and for alternately reversing the flow to drive the piston toward said one end;

conduit means for connecting the output of the injector to said valve means to direct fluid from the injector through the flow meter;

second pulse generating means for generating pulses as a function of the incremental movement of the flow meter piston;

a first counter for accumulating a count of the pulses generated by the first pulse generating means;

a second counter for accumulating a count of the pulses generated by the second pulse generating means;

control means responsive as said piston approaches a predetermined point adjacent each end of the cylindrical chamber for sequentially (1) inhibiting said first and second counters, (2) operating said valve means to reverse movement of said piston, and (3) reenabling said first and second counters; and means responsive to the accumulation of a predetermined count in said first counter for sequentially storing and displaying the count accumulated in said second counter, and resetting both said first and second counters.

2. The apparatus of claim 1 wherein reenabling of the first and second counters by said control means is controlled by a signal from said first pulse generating means, whereby counting is always resumed at the same point in the cycle of the fuel injector system component.

3. The apparatus of claim 1 wherein said positive displacement flow meter includes a central mounting block and two housings mounted on opposite ends of the mounting block with axially aligned confronting cylindrical chambers in the housings and wherein one end of said piston is received in and slidable within each of said cylindrical chambers.

4. The apparatus of claim 1 wherein said fuel injector system component is a fuel pump and wherein said first pulse generating means generates pulses as a function of the revolutions of the pump camshaft.

5. The apparatus of claim 1 wherein said fuel injector system component is a fuel injector and wherein said first pulse generating means generates pulses as a function of the strokes of said fuel injector.

6. The apparatus of claim 5 including damper means in said conduit means to dampen out the pulsations in the flow of fluid from the injector and provides a continuous flow of fluid to said positive displacement flow meter.

7. The apparatus of claim 1 or 6 including start delay means which inhibits said first and second counters for a predetermined interval after start up to allow the flow of fluid to the positive displacement flow meter to stabilize.

8. The apparatus of claim 1 or 2 including means within said control means for delaying reenabling of the first and second counters following reversal of the piston of said positive displacement flow meter until piston movement in the new direction has stabilized.

* * * * *